United States Patent Office 3,153,261
Patented Oct. 20, 1964

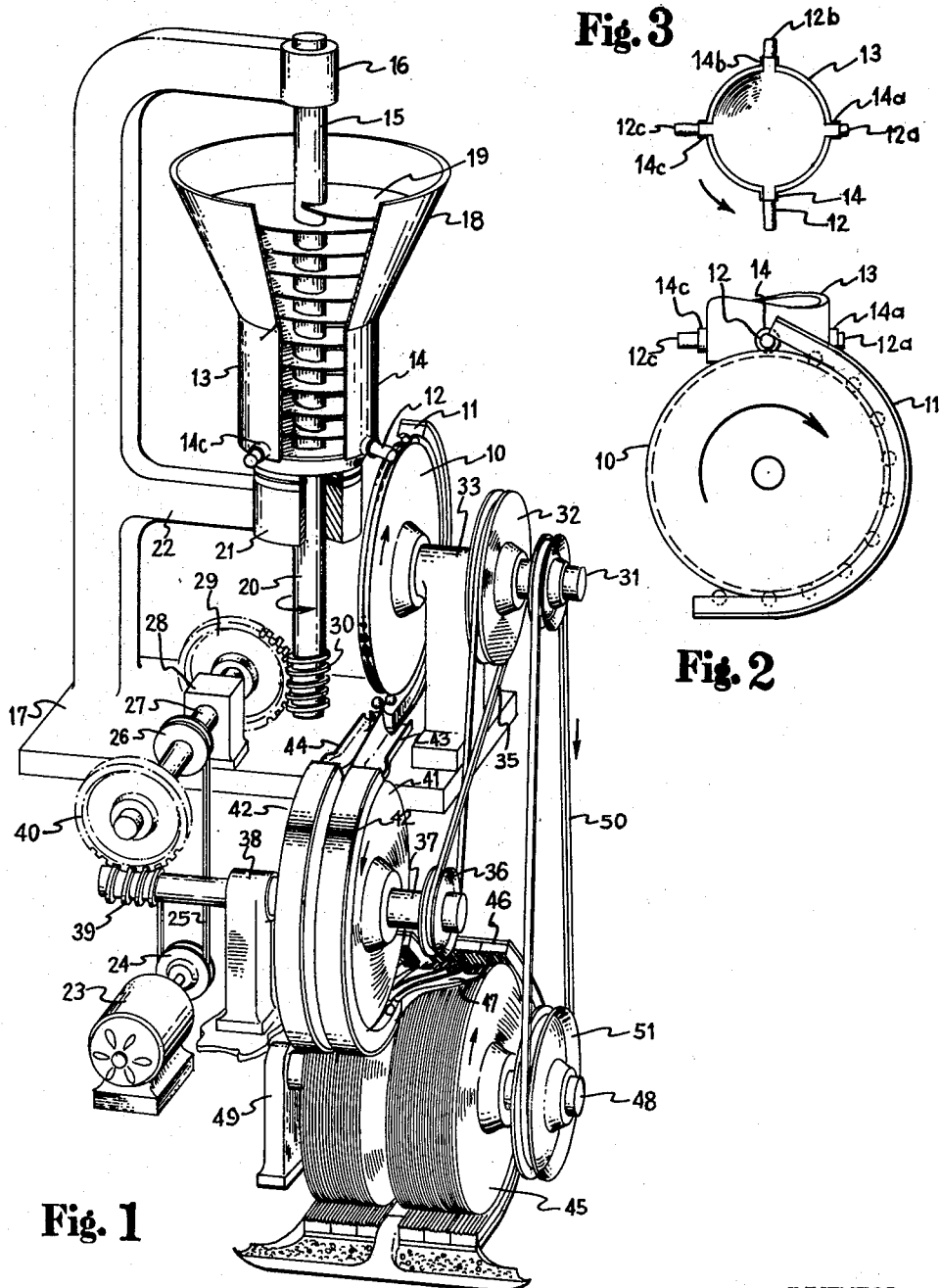

3,153,261
MECHANISM, INCLUDING FEED MEANS THEREFOR FOR RAPIDLY PRODUCING A PLURALITY OF BODIES OF REVOLUTION
Kalman Z. Huszar, 12021 Snider Road, Cincinnati, Ohio
Filed May 9, 1961, Ser. No. 108,851
6 Claims. (Cl. 18—5)

This invention resides in the provision of means and mechanisms for rapidly producing a plurality of bodies of revolution.

In Huszar Patent 2,867,000, dated January 6, 1959, and entitled "Mechanism for Forming Various Articles From Moldable Materials," there is shown a satisfactory mechanism for forming a body of revolution from moldable material. It has recently developed, however, that some industries require a great number of fairly small objects on the order of ⅛ inch in diameter. Although the mechanism of the aforementioned patent is capable of making objects of this size, it does not, standing alone, make them fast enough. One of the difficulties is that heretofore there were no satisfactory means for feeding the moldable material to the ball forming mechanism fast enough. Another difficulty is that heretofore there has been no satisfactory way of feeding the moldable material simultaneously to ball forming mechanism having a plurality of material receiving grooves.

A very important object of this invention is to provide means for very rapidly feeding moldable material to mechanism for producing bodies of revolution.

A further object of this invention is to provide a novel extruder comprising a stationary worm and a rotatable cylinder having, preferably, a plurality of discharge ports.

Another important object of this invention is to provide mechanism which will simultaneously produce a large number of bodies of revolution in continuous manner.

Another object of the invention is to provide means for forming bodies of revolution, which means are easy to construct and operate, inexpensive to manufacture and of durable construction.

These and other objects of this invention will become apparent to those skilled in the art from the description to follow, in light of the foregoing remarks, and with reference to the accompanying drawing, in which drawing like numerals are employed to designate like parts and in which:

FIGURE 1 is a perspective view, with parts broken away, of the complete apparatus for forming a plurality of bodies of revolution according to this invention, FIGURE 2 is a fragmentary perspective view, partly diagrammatic, illustrating a portion of the novel mechanism of this invention, and FIGURE 3 is a plan view taken from above the apparatus of FIGURE 2.

Referring first to FIGURE 2, a suitable mechanism for forming bodies of revolution comprises a grooved forming wheel 10 and a spring biased resilient pad 11 which cooperates therewith to form an object from a slug of moldable material 12 introduced between the wheel 10 and pad 11. This forming mechanism is shown and claimed in detail in the aforementioned Huszar Patent 2,867,000. Although in the passages to follow this forming mechanism will often be described as producing "spherical" objects, it is to be understood that bodies of revolution other than spheres may readily be produced, according to the shape of the grooves in the forming wheel 10.

Referring now to FIGURE 1 there is illustrated novel means for rapidly feeding moldable material to forming mechanism such as that indicated at 10 and 11. This feed means comprises a rotating cylindrical extruder 13, having multiple delivery ports 14, and a stationary worm 15. The stationary worm 15 is fixed in a suitable bracket 16 which is a part of the general framework indicated at 17. All of the mechanism to be described will derive its support from this framework 17 in the usual manner.

Preferably the extruder 13 has an enlarged hopper 18 to receive moldable material delivered by a laborer or conveyor as desired. The flights 19 of the worm 15 will conform to the shape of the extruder 13 and hopper 18 so that material fed into the hopper will be forced towards and out the ports 14 as the extruder 13 is rotated about the stationary worm 15.

The extruder 13 has a shaft 20 fixed thereto and depending therefrom. The extruder 13 may rest and rotate on a suitable bearing 21 located on a bracket 22 which is a part of the general framework 17. As indicated, the shaft 20 is fixed to the extruder 13 so that rotation of the shaft 20 results in corresponding rotation of the extruder 13 while the worm 15 remains stationary since it is fixed against movement in its bracket 16.

Certain features of the extruder 13 are diagrammatically illustrated in FIGURES 2 and 3. In these figures the extruder is shown, for purposes of illustration only, as having four discharge ports or spouts 14. At the port 14 which is adjacent the grooved wheel 10 and resilient pad 11 in FIGURE 2, a complete slug 12 of moldable material is being delivered between these members 10 and 11. As the extruder 13 continues to rotate additional moldable material will be gradually extruded from the port 14. When this port has come to the position 14a, which is at one quarter of a turn of the extruder 13, a new slug will have started to be formed and this is indicated at 12a. Upon another quarter turn of the extruder 13 additional material will have been pushed through the spout 14 so that the slug has grown from the size indicated at 12a to that indicated at 12b. Another quarter turn of the extruder 13 results in further material being extruded from the spout 14 as indicated at 14c and 12c. Finally, upon completion of a full revolution of the extruder 13, a full size slug 12 is again presented between the members 10 and 11. It will be understood that this gradual extrusion of material from a single port as the extruder 13 revolves will be duplicated for every port or spout 14 provided in the extruder. The exact number of these ports does not constitute a limitation on this invention and although four such ports have been shown it will be readily apparent that many more may be utilized if desired.

Not only may various numbers of the ports 14 be utilized, depending on the size of the apparatus, the size of the ports and the type of material being molded, as well as on the speed of rotation of the extruder 13, but also the material issuing from the ports may be taken off at more than one place. Thus, for example, the various members may be so arranged that, considering any individual port 14, a slug of desired size will be extruded from such port upon each one-third revolution of the extruder 13, whereupon three sets of forming mechanism 10, 11 would be used with each extruder 13.

Any suitable means for rotating the extruder 13 may be employed. For purposes of illustration only, the drive means is shown as comprising a motor 23 having a drive pulley 24 and belt 25 which engages a pulley 26 on the shaft 27. The shaft 27 is shown as passing into a gear change and speed control box 28. The output shaft from the box 28 has a gear 29 mounted thereon which meshes with a suitable worm gear 30 on the shaft 20 of the extruder 13. The box 28 and gears 29 and 30 are so arranged as to impart counterclockwise rotation to the extruder 13 as viewed in FIGURE 1. This insures that a slug 12 will be brought to the members 10 and 11.

In FIGURES 1 and 2 the member 10 is illustrated as having a pair of ball forming grooves which cooperate with the spring biased resilient pad 11. The slug 12 is sufficiently large as to permit a pair of balls to be formed by the double grooved member 10 in cooperation with the member 11. Any excess material may be collected and returned to the hopper 18 by any desired member. The principal requirement in this connection is that the slug 12 be large enough to permit balls to be formed in each of the grooves, no matter how many, provided in the member 10.

In order to produce a great number of balls, the mechanism of this invention is so arranged that the first pair of members 10 and 11 will form balls and also act as a feed or delivery means for introducing the balls so formed to other members which will in turn make smaller balls of those delivered to it. It should be observed that the complete structure by which the spring biased, resilient pad 11 is held in position with respect to the grooved member 10 is not illustrated in these figures; rather these members are rather diagrammatically illustrated for their full structure is known to the art as exemplified in the disclosure of the aforementioned Huszar Patent 2,867,000. These remarks also apply to the other ball forming members to be described.

The grooved forming wheel 10 is illustrated as mounted on the shaft 31. Also fixed on the shaft 31 is a pulley 32. This shaft 31 is mounted for rotation within a bearing 33 which is a part of the general frame structure 17. The pulley 32 is driven by a belt 35 which engages a pulley 36 on the shaft 37. This shaft 37 has a suitable bearing 38 which may also be considered as supported by the general framework 17.

The shaft 37 terminates in a worm gear 39 which meshes with a gear 40 on the shaft 27 which is driven by the motor 23 through the sprocket 24, belt 25 and sprocket 26. The arrangement of the various gears is such that the shaft 37 is rotating in a counterclockwise direction as viewed from the right side of FIGURE 1

Also fixed on the shaft 37 is an additional pair of ball forming members, each one of the pair being illustrated as comprising a multiple grooved forming member 41 and a cooperating, spring biased, resilient pad 42. Each of the pair of members 41 and 42 receives a succession of balls delivered from the pair of members 10 and 11. This is accomplished by having the balls delivered from the members 10 and 11 fall into separate guide means 43 and 44 so that the balls from one side of the members 10 and 11 are delivered to one set of the members 41 and 42 while the balls delivered from the other side of the members 10 and 11 are delivered to the other set of members 41 and 42.

An important feature of this arrangement is that the size of the plurality of grooves in a member 41 is such that a single ball delivered from the members 10 and 11 will serve as a slug sufficient, at least, to fill all of the grooves in the member 41. Thus a ball delivered from the members 10 and 11 is similar in effect to the slug 12 delivered *to* the members 10 and 11. In other words, the relationship between a ball delivered by the members 10 and 11 and the grooves in the multiple grooved forming member 41 is such that the ball will serve as a slug sufficient to be divided into a plurality of other balls in accordance with the number of grooves in the member 41. The ball delivered by the members 10 and 11 must be large enough, or the grooves in the member 41 must be small enough, that there are as many balls formed from a single ball delivered by the members 10 and 11 as there are grooves in the member 41.

It has been noted that the shaft 37 and its members 41 are moving in a counterclockwise direction as viewed from the right side of FIGURE 1. Since it is necessary that the shaft 31 and its member 10 rotate in a clockwise direction as similarly viewed, the belt 35 is shown as being crossed. This, of course, may be accomplished in other well known and conventional arrangements.

Preferably a third set of ball forming members is utilized. This set is illustrated as comprised of a plurality of pairs of grooved forming members 45 and cooperating spring biased, resilient pads 46. Dividing means generally indicated at 47 are provided for the members 41 and 42 so that the balls delivered from each of the grooves in the member 41 are in turn directed to separate members 45 and 46 so that they may be further separated into even smaller balls. Again, it will be understood that the size of each of the balls delivered from the members 41 and 42 is sufficient to fill the grooves in the member 45 to which it is directed. In other words, each of these balls delivered from the members 41 and 42 comprises a slug which is introduced between the members 45 and 46 just as the slug 12 was introduced between the members 10 and 11. Again, the size of the balls delivered from the members 41 and 42 must be so related to the size of the grooves in the member 45 that there will be as many balls made from each of the balls delivered from the members 41 and 42 as there are grooves in the member 45 to which each of these balls is directed.

The members 45 are shown as being mounted on a shaft 48 rotatably mounted in bearings 49 which again are intended to be part of the general framework 17. The shaft 48 is driven from the shaft 31 by means of a belt 50 engaging the pulley 51. Rotation of the shaft 48 and its members 45 is also in a clockwise direction, as viewed from the right side of FIGURE 1, as also is the shaft 31 and its member 10.

By providing the ball forming members 10 and 11, 41 and 42, and 45 and 46, arranged in the manner as herein explained, and by providing the rapidly rotating cylindrical extruder 13, having multiple delivery ports 14 and a fixed worm 15, a great number of spherical objects may be produced in a very short time. This may be demonstrated, by way of example only, as follows. If the slug of material extruded from a port 14 is 5/16 inch in diameter and 3/4 inch long, a pair of grooves may be provided in the member 10 so that each of the two balls formed from a single slug 12 will have a diameter of 3/8 inch. There will, therefore, be a pair of the members 41 and 42. Each of these members 41 will have three grooves therein. Each of the two sets of the members 41 and 42 will produce from each 3/8 inch ball introduced therein, three balls of 1/4 inch diameter. That is to say, the three grooves in each of the members 41 are of such size as to divide a ball of 3/8 inch diameter into three balls of 1/4 inch diameter. Thus there will be six balls of 1/4 inch diameter delivered from the two sets of members 41 and 42. These balls are in turn delivered to the set of members 45 and 46. There will be six sets of these members and each of the grooved forming wheels 45 will have eight grooves therein. The relationship between the size of the eight grooves in a member 45 to the 1/4 inch ball delivered to it is such that eight balls of 1/8 inch diameter will be produced. This means that at any one time 48 balls of 1/8 inch diameter will be delivered simultaneously from the sets of members 45 and 46.

From the foregoing illustration it will be observed that by starting with a slug 12, 5/16 inch diameter and 3/4 inch long, and relating the sets of members 10 and 11, 41 and 42, and 45 and 46 in the manner set forth, a total of 48 balls of 1/8 inch diameter may be obtained from each such slug 12. Since the multiple ported, cylindrical extruder is capable of delivering ten slugs 12 per second to the members 10 and 11, and since each of these ten slugs 12 will be divided into 48 balls of 1/8 inch diameter, it follows that this apparatus will produce 28,800 1/8 inch balls per minute which is 1,728,000 1/8 inch balls per hour.

In the foregoing passages, suitable drive means for the extruder 13 and the various grooved forming wheels 10, 41 and 45 have been illustrated. These means, however, are by way of example only. It will readily be apparent to those skilled in the art that other satisfactory drive means may be employed. It is not necessary that all of the means derive their power from the single motor 23.

It is perfectly conceivable that each of the rotating elements in the system may have a separate, individual drive means. Thus, one such means may be used to drive the rotating, cylindrical extruder 13. A separate drive means may be utilized to drive the rotatable forming wheel 10. Still another drive means may be employed to drive the rotatable forming wheel 41. And even further, separate means may be employed to drive the rotatable forming wheel 45. These forming wheels such as illustrated in FIGURE 1 at 10, 41 and 45, in addition to the possibility of being independently driven as just explained, may be rotated at different speeds as found expedient. The relative sizes of these forming wheels may also vary and the number and size of the grooves in each of the forming wheels may also be varied. The extruder, and the various forming wheels, therefore, may be considered as individual units and as such each may have its own power source which will be utilized in accordance with the size of the unit, its relation to the other units and the various speeds required for each such unit.

It is desirable that the extruder and the various forming wheels be so arranged that each is independently adjustable. This is more easily accomplished when the extruder and forming wheels are separately driven. Independent adjustment of the extruder 13, for example, makes it possible to control the size of the slug extruded, and this makes it possible to have a single extruder 13 feed a plurality of the initial forming wheels 10 if desired.

The invention has been illustrated as including an operative arrangement for driving the extruder 13 and the forming wheels 10, 41 and 45. As above indicated, however, the drive mechanism does not constitute a specific part of the invention per se, wherefore the other arrangements described, but not shown, are quite possible and sometimes very desirable. Anyone reasonably skilled in the art could provide any of a number of satisfactory means for driving the various rotatable members herein described.

It is also to be emphasized that the invention is not to be limited, except insofar as specifically set forth in the subjoined claims, to the use of any given number of forming wheels or to the size and number of grooves in any of the forming wheels. Although three sets of forming wheels are shown in the figures, more or less of these may be employed as desired.

From the foregoing it will be plainly evident that the apparatus of this invention may be varied and adjusted to make bodies of revolution of many different sizes as desired and with exceptional speed as indicated.

It is to be understood that while this invention has been shown and explained in terms of particular arrangements and structures, this has been for purposes of illustration and the claims are not to be limited to such structures and arrangements except insofar as they are specifically set forth in the claims. Furthermore, it will be apparent to those skilled in the art that modifications may be made in the invention without departing from the scope and spirit thereof.

Having thus described the invention, what is claimed as new and what is desired to be protected by United States Letters Patent is:

1. Mechanism for producing a plurality of bodies of revolution which comprises a first unit, said first unit comprising a grooved forming member and a resilient back-up member, an extruder which extrudes a slug of moldable material between said grooved forming member and said back-up member, means to rotate said grooved forming member, said back-up member being located so that said slug is squeezed between said rotating grooved forming member and said back-up member to form a body of revolution, a second unit, said second unit comprising at least one multiple-grooved forming member and a second resilient back-up member, the grooves in said multiple forming member being smaller than the groove in said first mentioned forming member, means to introduce a body of revolution from said first unit between said multiple grooved forming member and said second back-up member, means to rotate said multiple grooved forming member, and said second back-up member being located so that a body of revolution introduced between said rotating multiple grooved member and said second back-up member is squeezed into the grooves of said multiple grooved member, whereby to form a plurality of bodies of revolution smaller than the body of revolution obtained from said first unit.

2. The mechanism of claim 1 including a third unit, said third unit comprising at least one additional multiple grooved forming member and a third resilient back-up member, the grooves in said additional multiple grooved forming member being smaller than the grooves in the multiple grooved forming member of said second unit, means to introduce a body of revolution from said second unit between said additional multiple grooved forming member and said third back-up member, means to rotate said additional multiple grooved forming member, and said third back-up member being located so that a body of revolution introduced between said rotating additional multiple grooved forming member and said third back-up member is squeezed into the grooves of said additional multiple grooved forming member, whereby to form a plurality of additional bodies of revolution smaller than the bodies of revolution obtained from said second unit.

3. The mechanism of claim 2 in which the grooved forming member of the first unit has two equal grooves; in which there are two identical multiple grooved forming members in said second unit, each of said multiple grooved forming members of said second unit having three equal grooves, the said means for introducing a body of revolution from said first unit to said second unit being arranged to introduce a body of revolution between each of the two multiple grooved forming members and the respective second back-up member; and in which there are six identical additional multiple grooved forming members in said third unit, each of said additional multiple groved forming members of said third unit having eight equal grooves, the said means for introducing a body of revolution from said second unit to said third unit being arranged to introduce a body of revolution between each of the six additional multiple grooved forming members and the respective third back-up member, whereby forty-eight bodies of revolution are obtained from each slug of moldable material introduced between the said grooved forming member and the said back-up member of said first unit.

4. The mechanism of claim 1 in which said extruder comprises a stationary worm and a rotating cylinder having a plurality of discharge ports, said worm being located within said cylinder, and means to rotate said cylinder.

5. The mechanism of claim 4 in which said cylinder and ports are so arranged that material extruded from the ports is caught between the first mentioned grooved forming member and the first mentioned back-up member.

6. The mechanism of claim 5 in which said cylinder has an outwardly flared hopper portion, said worm having flights which conform with both the cylinder and the hopper portion.

References Cited in the file of this patent

UNITED STATES PATENTS

| | | |
|---|---|---|
| 2,091,124 | Stewart | Aug. 24, 1937 |
| 2,783,921 | Stokland | Mar. 5, 1957 |
| 2,848,738 | Bonnafoux | Aug. 26, 1958 |
| 2,867,000 | Huszar | Jan. 6, 1959 |
| 2,933,762 | Pumphrey | Apr. 26, 1960 |
| 2,996,756 | Korsch et al. | Aug. 23, 1961 |
| 3,010,150 | Meakin | Nov. 28, 1961 |